US008112858B2

(12) United States Patent
Robles

(10) Patent No.: US 8,112,858 B2
(45) Date of Patent: Feb. 14, 2012

(54) METHOD FOR TRANSFORMING A CONTAINER INTO AN ARTICLE

(76) Inventor: Jorge Ledesma Robles, Troy, MI (US)

( * ) Notice: Subject to any disclaimer, the term of this patent is extended or adjusted under 35 U.S.C. 154(b) by 1340 days.

(21) Appl. No.: 11/653,006

(22) Filed: Jan. 12, 2007

(65) Prior Publication Data

US 2008/0168642 A1 Jul. 17, 2008

(51) Int. Cl.
*B21K 21/16* (2006.01)
*B23P 23/04* (2006.01)

(52) U.S. Cl. ...... 29/401.1; 29/407.05; 29/428; 700/233; 700/235; 221/135

(58) Field of Classification Search ................. 29/401.1, 29/407.01, 407.05, 557, 428; 700/233, 234, 700/235; 221/24, 66, 135
See application file for complete search history.

(56) References Cited

U.S. PATENT DOCUMENTS

| | | | | |
|---|---|---|---|---|
| 1,018,911 | A | 2/1912 | Kaiser | |
| 2,770,915 | A | 11/1956 | Hicks | |
| 3,018,583 | A | 1/1962 | Novotney | |
| 3,154,882 | A | 11/1964 | La Bossiere | |
| 3,236,088 | A | 2/1966 | Moller | |
| 3,387,474 | A | 6/1968 | Shoemaker, Jr. et al. | |
| 3,654,727 | A | 4/1972 | Span et al. | |
| 3,777,392 | A | 12/1973 | Span et al. | |
| 3,883,983 | A | 5/1975 | Coster | |
| 4,261,133 | A | 4/1981 | Hanson et al. | |
| 4,551,109 | A | 11/1985 | Hanson | |
| 4,653,627 | A | 3/1987 | Hampson et al. | |
| 4,714,444 | A | 12/1987 | Rendel | |
| 4,884,328 | A | 12/1989 | Neighbors | |
| 4,919,274 | A | 4/1990 | Hammond | |
| 5,036,472 | A * | 7/1991 | Buckley et al. | 700/233 |
| 5,154,657 | A | 10/1992 | Wildman et al. | |
| 5,402,872 | A | 4/1995 | Clurman | |
| 5,630,493 | A | 5/1997 | DeWoolfson et al. | |
| 5,704,558 | A | 1/1998 | Arrott | |
| 5,768,142 | A * | 6/1998 | Jacobs | 700/231 |
| 5,918,721 | A | 7/1999 | Weinberger | |
| 5,950,475 | A | 9/1999 | Penny | |
| 6,055,839 | A | 5/2000 | Hughson | |
| 6,176,755 | B1 | 1/2001 | Bye et al. | |
| 6,983,635 | B2 | 1/2006 | Rockhold | |
| 7,299,109 | B2 * | 11/2007 | Juds et al. | 700/238 |

* cited by examiner

*Primary Examiner* — Jermie Cozart
(74) *Attorney, Agent, or Firm* — Patents+TMS, P.C.

(57) ABSTRACT

An apparatus, a system and a method transform a container into an article. The apparatus, the system and the method operate as a vending machine that allows a user to deposit the container and/or money into the vending machine. After receiving the container and/or the money, a shape of the container, a barcode on the container, and/or a weight of the container are analyzed to determine whether to accept the container or to reject the container. If the container is rejected, the container and/or the money are returned to the user. If the container is accepted, the apparatus, the system and/or the method cuts, washes and/or dries the container. The apparatus, the system and/or the method further cuts, presses, flanges and/or wraps the container into an article. The article may be a toy car and/or other novelty item. A window allows the user to observe the container transformed into the article. A decal may be delivered to the user to decorate the article.

8 Claims, 3 Drawing Sheets

METHOD FOR TRANSFORMING A CONTAINER INTO AN ARTICLE

BACKGROUND OF THE INVENTION

The present invention generally relates to an apparatus, a system and a method for transforming a container into an article. More specifically, the present invention relates to an apparatus, a system and a method that operate as a vending machine. A user may deposit the container and/or money into the vending machine. The container may be an empty beverage container, such as, for example, an aluminum soda can and/or a plastic bottle. The money may be deposited as, for example, cash, coins, tokens, credit cards, debit cards, ATM cards and/or checks. The apparatus and/or the system may have a receiving bay for receiving the container. The apparatus and/or the system may have one or more deposit slots for receiving the money. After receiving the container and the money, the apparatus, the system and/or the method may analyze a shape of the container, a barcode on the container, and/or a weight of the container to determine whether to accept the container as a suitable container or to reject the container as an unsuitable container. If the apparatus, the system and/or the method rejects the container as an unsuitable container, the apparatus, the system and/or the method may return the unsuitable container and/or the money to the user.

If the apparatus, the system and/or the method accepts the container, the apparatus, the system and/or the method may cut in half, wash and/or dry the container creating component parts. The apparatus, the system and/or the method may further cut, press, flange and/or wrap the component parts into an article. The article may be a toy car and/or other novelty item that may be desirable to the user. Before and/or after depositing the container and/or money into the apparatus and/or the system, the user may select the article to be manufactured. The apparatus, the system and/or the method may have a window that may allow the user to observe the container transformed into the article. The apparatus, the system and/or the method may use additional fasteners and/or materials to form the article from the container. The apparatus, the system and/or the method may have a delivery bay for delivering the article to the user. Further, the apparatus, the system and/or the method may deliver one or more decals to the user for use in decorating the article. The apparatus, the system and/or the method may be controlled by a programming logic control (PLC). The apparatus, the system and/or the method may have one or more marks and/or advertisements.

It is generally known that vendors and/or retailers sell beverages and/or other consumable to consumers in one and/or more single serving containers (hereinafter "the containers"), such as, for example, aluminum cans, plastic bottles, glass bottles and/or the like. The vendors and/or retailers may incorporate a cost of a manufacture of the containers and/or a cost of a material of the containers in a selling price of the beverages. Typically, after the consumers drink and/or remove the beverages from the containers, the consumers may dispose of the containers in one or more ways. The consumers may dispose of the containers by placing the containers in the garbage and/or by sending the containers to be recycled.

After consuming and/or removing the beverages from the containers, the consumers may not recoup the value of the cost of the manufacture of the containers and/or the cost of the material of the containers. Further, the consumers may not use the containers for a purpose other than for holding, for drinking and/or for removing the beverages from the containers. Further, manually transforming the containers into an article useful for another purpose may be inconvenient to the consumers, may be difficult for the consumers and/or may be time consuming for the consumers. Moreover, the vendors, the retailers and/or one or more interested parties may not capitalize from the transforming of the containers if and/or when the consumers manually transform the material of containers into an article.

A need, therefore, exists for an apparatus, a system and/or a method for transforming a container into an article. Additionally, a need exists for an apparatus, a system and/or a method for transforming a container into an article that operate as a vending machine that may allow a user to deposit the container and money into the vending machine. Further, a need exists for an apparatus, a system and/or a method that has one or more deposit slots for receiving the money. Still further, a need exists for an apparatus, a system and/or a method that may analyze a shape of the container, a barcode on the container, and/or a weight of the container to determine whether to accept the container as a suitable container or to reject the container as an unsuitable container. Still further, a need exists for an apparatus, a system and/or a method that may return the unsuitable container and/or the money to the user. Still further, a need exists for an apparatus, a system and/or a method that may cut in half, wash and/or dry the suitable container creating component parts. Still further, a need exists for an apparatus, a system and/or a method that may further cut, press, flange and/or wrap the component parts into an article. Still further, a need exists for an apparatus, a system and/or a method that may allow the user to select the article to be manufactured. Still further, a need exists for an apparatus, a system and/or a method that may have a window that may allow the user to observe the container transformed into the article. Still further, a need exists for an apparatus, a system and/or a method that may use additional fasteners and/or materials to form the article from the container. Still further, a need exists for an apparatus, a system and/or a method that may have a delivery bay for delivering the article to the user. Moreover, a need exists for an apparatus, a system and/or a method that may deliver decals to the user for decorating the article. Additionally, a need exists for an apparatus, a system and/or a method that may advertise to one or more users.

SUMMARY OF THE INVENTION

The present invention generally relates to an apparatus, a system and/or a method for transforming a container into an article. The apparatus, the system and/or the method may operate as a vending machine that may allow a user to deposit the container and money into the vending machine. The container may be, for example, an empty beverage container such as, for example, an aluminum soda can and/or a plastic bottle. The money may be deposited as, for example, cash, coins, tokens, credit cards, debit cards, ATM cards and/or checks. The apparatus and/or the system may have a receiving bay sized for receiving the container. The apparatus and/or the system may have one or more deposit slots for receiving the money.

After receiving the container and/or the money, the apparatus, the system and/or the method may analyze a shape of the container using one or more sensors and/or one or more rotatable motorized rods. Further, the apparatus, the system and/or the method may read a barcode on the container using a laser reader. Still further, the apparatus, the system and/or the method may weigh the container with one or more spring sensors connected to one or more of the motorized rods.

After analyzing the shape of the container, reading the barcode on the container and/or weighing the container, the apparatus, the system and/or the method may determine whether to accept the container as a suitable container and/or to reject the container as an unsuitable container. The apparatus, the system and/or the method may use a selector to engage and/or to transport the container from the receiving bay to a second step of manufacture. If the apparatus, the system and/or the method rejects the container as an unsuitable container, the apparatus, the system and/or the method may use the selector to return the unsuitable container to the user. The apparatus, the system and/or the method may return the money to the user.

If the apparatus, the system and/or the method accepts the container, the apparatus, the system and/or the method may secure the container at one or more ends of the container with one or more rotating members. The apparatus, the system and/or the method may use a rotatable disc blade to cut the container into two halves along a longitudinal axis of the container. The apparatus, the system and/or the method may wash one or more halves of the container using a water-based solution. The apparatus, the system and/or the method may dry one or more halves of the container using one or more air blowers. One or more of the washed halves and/or the dried halves of the container may become component parts for manufacture of the article. The apparatus, the system and/or the method may further cut, press, flange and/or wrap the component parts into the article. The article may be a toy car and/or other novelty item that may be desirable to the user.

Before and/or after depositing the container and/or money into the apparatus and/or the system, the user may select the article to be manufactured. The apparatus, the system and/or the method may have a window that may allow the user to observe the container transformed into the article. The apparatus, the system and/or the method may use additional fasteners and/or materials to form the article from the component parts. The apparatus, the system and/or the method may have a delivery bay sized for delivering the article to the user. Further, the apparatus, the system and/or the method may deliver decals to the user for use in decorating the article. The apparatus, the system and/or the method may be controlled by a PLC. The apparatus, the system and/or the method may have one or more marks and/or advertisements.

To this end, in an embodiment of the present invention, an apparatus for transforming a container into an article is provided. The apparatus has a base portion having a height defined between a top side of the base portion and a bottom side of the base portion wherein the bottom side of the base portion is in a position opposite to the top side of the base portion wherein the base portion has a payment panel for receiving a payment wherein the base portion has a delivery bay sized to deliver the article wherein the base portion has a decal slot sized to deliver a decal used to decorate the article. Further, the apparatus has a hood portion having a height defined between a top surface of the hood portion and a bottom end of the hood portion wherein the bottom end of the hood portion is in a position opposite to the top surface of the hood portion wherein the hood portion has a width defined between a front side of the hood portion and a backside of the hood portion wherein the backside of the hood portion is in a position opposite to the front side of the hood portion wherein the hood portion is in a position adjacent to the top side of the base portion wherein the hood portion is connected to the top side of the base portion at the bottom end of the hood portion wherein the hood portion has a receiving bay sized to receive the container wherein the front side of the hood portion is made from a transparent material.

In an embodiment, the apparatus has a screen integrally formed with the base portion wherein the screen displays information.

In an embodiment, the apparatus has a panel integrally formed with the base portion wherein the panel receives a plurality of information.

In an embodiment, the apparatus has indicia on the base portion wherein the indicia is an advertisement.

In an embodiment, the apparatus has a selector adjacent to the receiving bay of the hood portion wherein the selector is sized to receive the container.

In an embodiment, the apparatus has a die for pressing the container into a press wherein the press is formed as a negative image of the article.

In another embodiment of the present invention, a system for transforming a container into an article is provided. The system has a selector wherein the selector is sized to receive the container wherein the selector rotates at a hinge in a first direction wherein the selector rotates at the hinge in a second direction wherein the second direction is opposite to the first direction wherein the selector rotates at the hinge in the first direction to return the container wherein the selector rotates at the hinge in the second direction to accept the container. Further, the system has a rod adjacent to the selector wherein the rod is positioned to support a weight of the container wherein the rod rotates in a first direction wherein the rod is connected to a sensor to determine the weight of the container. Still further, the system has a blade adjacent to the selector to cut the container into a first portion of the container and a second portion of the container. Still further, the system has a cleaning member adjacent to the first portion of the container and the second portion of the container to spray the first portion of the container and the second portion of the container with a cleaning solution. Still further, the system has a blower adjacent to the cleaning member to dry the first portion of the container and the second portion of the container. Still further, the system has cutting rods adjacent to the cleaning member to cut the container into a plurality of pieces. Still further, the system has a die adjacent to the blade to press the container into a press wherein the press is formed as a negative image of the article and further wherein the die is formed as a positive image of the manufactured good.

In an embodiment, the system has a laser reader adjacent to the selector to read a barcode on the container.

In an embodiment, the system has a sensor adjacent to the selector to determine a shape of the container.

In an embodiment, the system has a programming logic control connected to the selector to control the selector.

In an embodiment, the system has rotating members adjacent to the selector to secure the container and to transport the first portion of the container and the second portion of the container to the cleaning member and to the blower.

In an embodiment, the system has a table to secure the press wherein the table rotates to invert the press to release the article.

In another embodiment, a method for transforming a container into an article is provided. The method has the step of analyzing a weight of the container to determine if the container is empty. Further, the method has the step of cutting the container into a first portion and a second portion. Still further, the method has the step of cleaning the first portion of the container and the second portion of the container. Still further, the method has the step of drying the first portion of the container and the second portion of the container. Still further, the method has the step of pressing the first portion of the container between a press and a first die to form an exterior of the article. Still further, the method has the step of cutting the second portion of the container into a plurality of pieces. Still further, the method has the step of pressing at least one of the plurality of pieces between the press containing the exterior of the article and a second die to form an interior of the article.

In an embodiment, the method has the step of determining a shape of the container.

In an embodiment, the method has the step of reading a barcode of the container to determine an origin of the container.

In an embodiment, the method has the step of delivering a decal to decorate the article.

In an embodiment, the method has the step of securing a flange of the exterior of the article to the interior of the article.

In an embodiment, the method has the step of providing a bay to receive the container.

In an embodiment, the method has the step of selecting the article to be made from the container.

In an embodiment, the method has the step of providing a delivery bay to deliver the article.

It is, therefore, an advantage of the present invention to provide an apparatus, a system and/or a method for transforming a container into an article.

Another advantage of the present invention is to provide an apparatus, a system and/or a method for transforming a container into an article which may operate as a vending machine that may allow a user to deposit the container and/or money into the vending machine.

And, another advantage of the present invention is to provide an apparatus, a system and/or a method for transforming a container into an article which may have a receiving bay for receiving the container.

Yet another advantage of the present invention is to provide an apparatus, a system and/or a method for transforming a container into an article which may which may analyze a shape of the container, a barcode on the container, and/or a weight of the container to determine whether to accept the container as a suitable container or to reject the container as an unsuitable container.

A further advantage of the present invention is to provide an apparatus, a system and/or a method for transforming a container into an article which may return an unsuitable container and/or money to the user.

Moreover, an advantage of the present invention is to provide an apparatus, a system and/or a method for transforming a container into an article which may cut in half, wash and/or dry the container creating component parts.

And, another advantage of the present invention is to provide an apparatus, a system and/or a method for transforming a container into an article which may cut, press, flange and/or wrap component parts of the container into the article.

Yet another advantage of the present invention is to provide an apparatus, a system and/or a method for transforming a container into an article which may allow a user to select the article to be manufactured from the container.

Another advantage of the present invention is to provide an apparatus, a system and/or a method for transforming a container into an article which may have a window that may allow a user to observe the container transformed into the article.

Yet another advantage of the present invention is to provide an apparatus, a system and/or a method for transforming a container into an article which may use additional fasteners and/or materials to form the article from the container.

A still further advantage of the present invention is to provide an apparatus, a system and/or a method for transforming a container into an article which may have a delivery bay for delivering the article to a user.

Moreover, an advantage of the present invention is to provide an apparatus, a system and/or a method for transforming a container into an article which may deliver one or more decals to the user for use in decorating the article.

And, another advantage of the present invention is to provide an apparatus, a system and/or a method for transforming a container into an article which may allow a user to create a toy and/or other novelty item made from the container.

Yet another advantage of the present invention is to provide an apparatus, a system and/or a method for transforming a container into an article which may increase sales of beverages from vending machines located in close proximity to the apparatus, the system and/or the method.

Moreover, an advantage of the present invention is to provide an apparatus, a system and/or a method for transforming a container into an article which may allow vendors, beverage retailers and/or other interested parties to make additional money off the containers that the vendors sell with the beverages.

And, another advantage of the present invention is to provide an apparatus, a system and/or a method for transforming a container into an article which may allow one or more vendors, retailers and/or other interested parties to advertise to consumers.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to an apparatus, a system and/or a method for transforming a container into an article. A user may deposit the container and/or money into the apparatus. The container may be, for example, an empty beverage container, such as, for example, an aluminum soda can and/or a plastic bottle. The money may be deposited as, for example, cash, coins, tokens, credit cards, debit cards, ATM cards and/or checks. The apparatus and/or the system may have a receiving bay for receiving the container. The apparatus and/or the system may have one or more deposit slots for receiving the money. After receiving the container and the money, the apparatus, the system and/or the method may analyze a shape of the container, a barcode on the container, and/or a weight of the container to determine whether to accept the container as a suitable container or to reject the container as an unsuitable container. If the apparatus, the system and/or the method rejects the container as an unsuitable container, the apparatus, the system and/or the method may return the unsuitable container and/or the money to the user.

If the apparatus, the system and/or the method accepts the container, the apparatus, the system and/or the method may cut in half, wash and/or dry the container creating component parts. The apparatus, the system and/or the method may further cut, press, flange and/or wrap the component parts into an article. The article may be a toy car and/or other novelty item that may be desirable to the user, such as, for example, replica of a car, a nameplate, a box, a replica of a baseball, a replica of a football, a replica of a basketball, a replica of a soccer ball, a photograph print plate, a toy battleship, a toy space ship, a picture frame, a letter opener, a coin, a piggy bank, a toy phone, a flower pot, a postcard, a tool, a frisbee, a boomerang, a toy helicopter, a wind chime, a weather vane, a lawn ornament, a toy soldier, a toy action figure, a toy doll, a piece of jewelry, an accessory for clothing and/or the like. Before and/or after depositing the container and/or money into the apparatus and/or the system, the user may select the article to be manufactured. The apparatus, the system and/or the method may have a window that may allow the user to observe the container transformed into the article. The apparatus, the system and/or the method may use additional fasteners and/or materials to form the article from the container. The apparatus, the system and/or the method may have a delivery bay for delivering the article to the user. Further, the apparatus, the system and/or the method may deliver one or more decals to the user for use in decorating the article. The apparatus, the system and/or the method may be controlled by a programming logic control (PLC). The apparatus, the system and/or the method may have one or more marks and/or advertisements.

Figure 1:
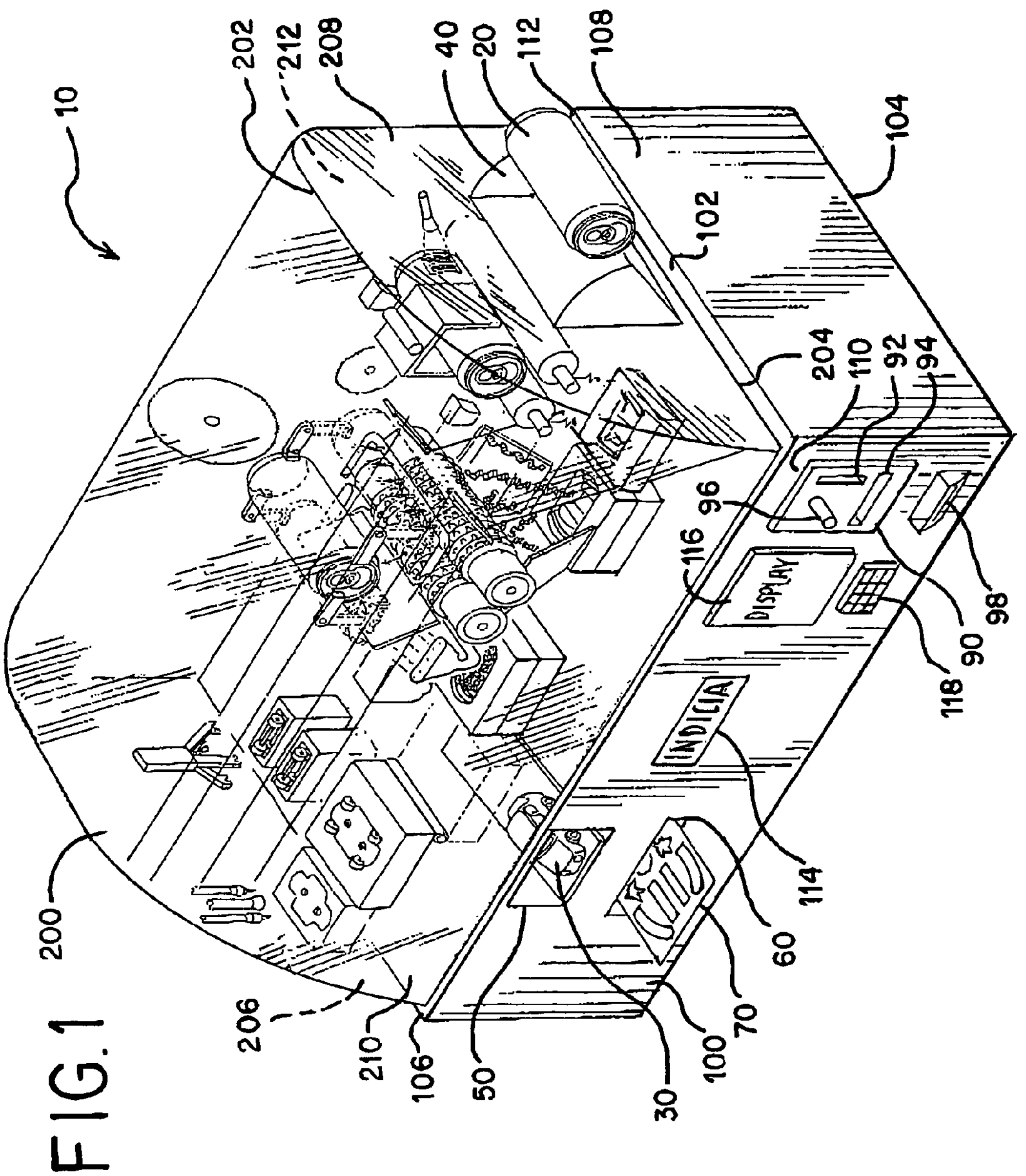
FIG. 1 illustrates a perspective view of an apparatus for transforming a container into an article in an embodiment of the present invention.
Figure 3:
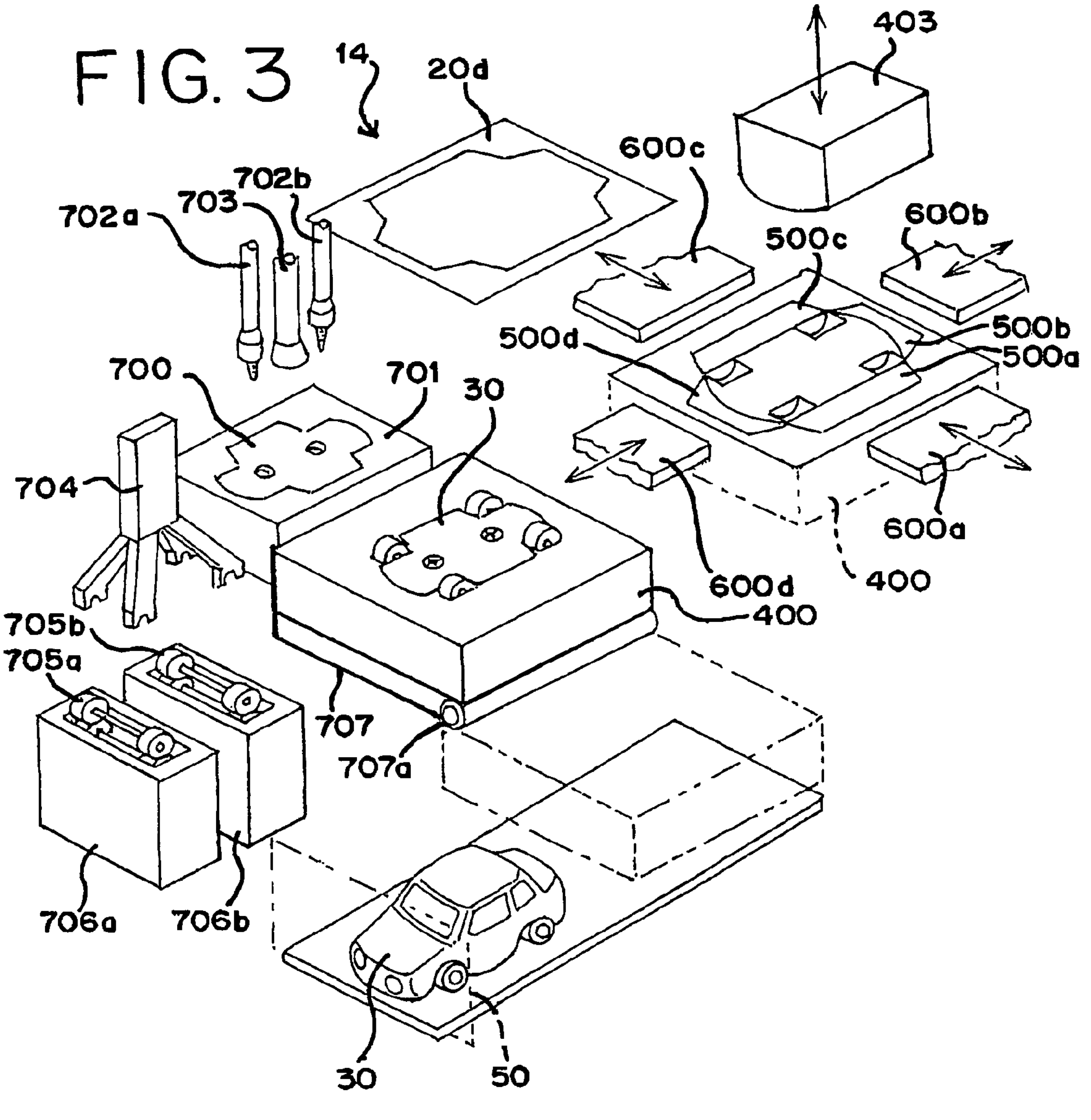
FIG. 3 illustrates a perspective view of a system for transforming a container into an article in an embodiment of the present invention.

Referring now to the drawings wherein like numerals refer to like parts, FIG. 1 illustrates an apparatus 10 for transforming a container 20 into an article 30 in an embodiment of the present invention. FIGS. 1 and 3 illustrate the article 30. In an embodiment, the article may be a novelty item such as, for example, a toy car, a nameplate, a box, a baseball, a football, a photograph print plate, a toy battle ship, a toy space ship and/or the like. The present invention should not be deemed as limited to a specific embodiment of the article 30. It should be understood that the article 30 may be any novelty item as known to one having ordinary skill in the art.

Figure 2:
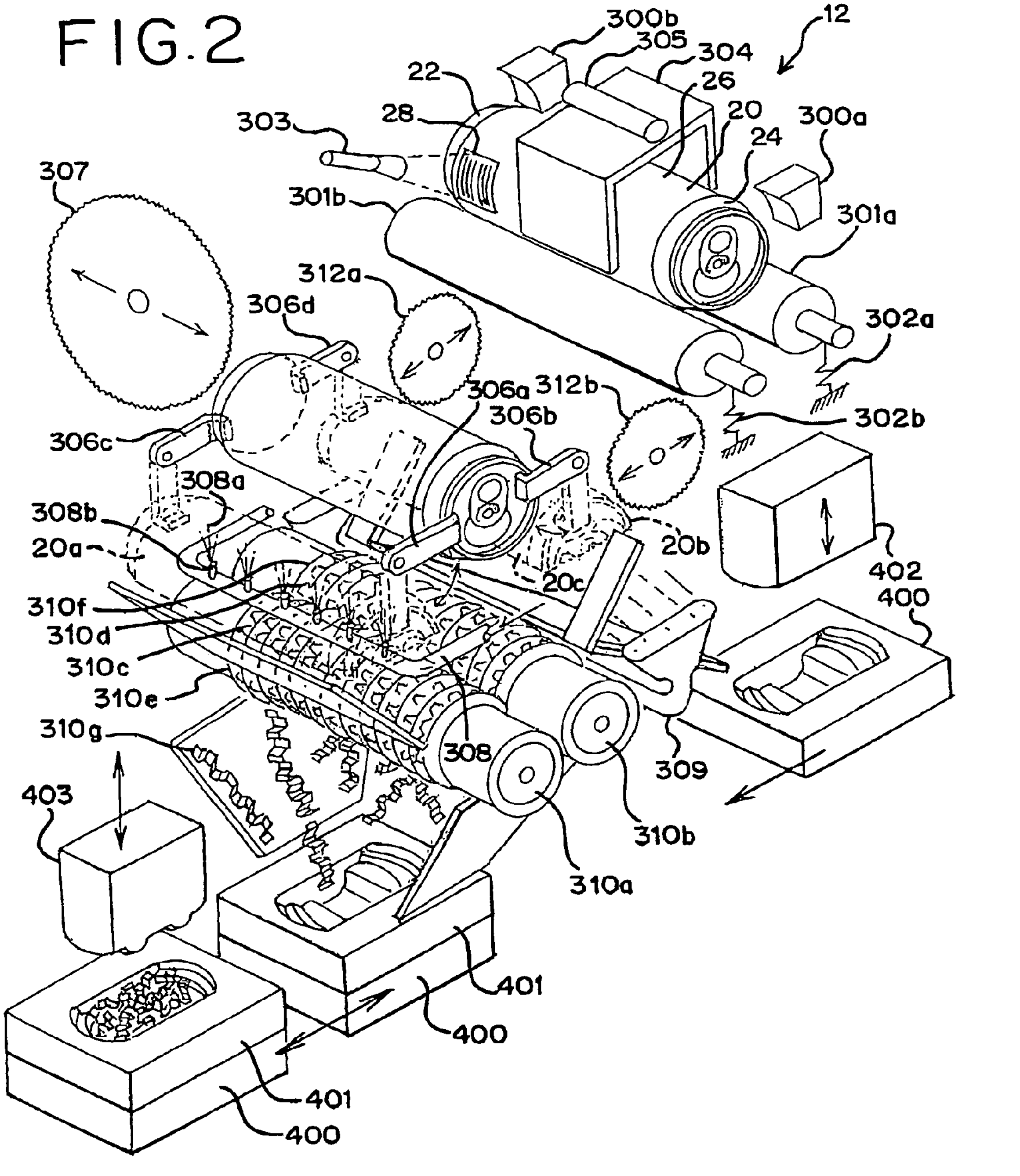
FIG. 2 illustrates a perspective view of a system for transforming a container into an article in an embodiment of the present invention.

FIGS. 1 and 2 illustrate the container 20. The container 20 may have bottom portion 22, a top portion 24, exterior walls 26 and/or a bar code 28. The top portion 24 of the container 20 may be located opposite to the bottom portion 22 of the container 20. The container 20 may be cylindrical and/or may be symmetrical about an axis of the container 20.

In an embodiment, the container 20 may be, for example, a can, a bottle and/or the like. In an embodiment, the container 20 may be made from a material, such as, for example, aluminum, plastic, glass and/or the like. In an embodiment, the container 20 may be empty. In an embodiment, the container 20 may contain a beverage. The present invention should not be deemed as limited to a specific embodiment of the material of the container 20 and/or a specific embodiment of the container 20. It should be understood that the container 20 may be any container for holding beverages as known to one having ordinary skill in the art.

As shown in FIG. 1, the apparatus 10 may have a base portion 100 and a hood portion 200. In an embodiment, the base portion 100 of the apparatus 10 may have a height defined between a top side 102 of the base portion 100 and a bottom side 104 of the base portion 100. The bottom side 104 of the base portion 100 may be in a position opposite to the top side 102 of the base portion 100. The base portion 100 may have a length defined between a first end 106 of the base portion 100 and a second end 108 of the base portion 100. The second end 108 of the base portion 100 may be in a position opposite to the first end 106 of the base portion 100. The base portion 100 may have a width defined between a front side 110 of the base portion 100 and a backside 112 of the base portion 100. The backside 112 of the base portion 100 may be in a position opposite to the front side 110 of the base portion 100. The present invention should not be deemed as limited to a specific embodiment of the base portion 100 of the apparatus 10.

In an embodiment, the first end 106 of the base portion 100, the second end 108 of base portion 100, the front side 110 of the base portion 100 and/or the backside 112 of the base portion may have a delivery bay 50 sized for delivering the article 30. In an embodiment, the first end 106 of the base portion 100, the second end 108 of base portion 100, the front side 110 of the base portion 100 and/or the backside 112 of the base portion may have a decal slot 60 sized for delivering one or more decals 70 for use in decorating the article 30. The decals 70 may be, for example, stickers, logos, photographs and/or the like. The present invention should not be deemed as limited to a specific embodiment of the decals 70 and/or the decal slot 60. It should be understood that the decals 70 may be any item for use in decorating the article 30 as known to one having ordinary skill in the art.

In an embodiment, the first end 106 of the base portion 100, the second end 108 of base portion 100, the front side 110 of the base portion 100 and/or the backside 112 of the base portion 100 may have a payment panel 90 for receiving a payment and/or a return bay 98 for returning money, change and/or a receipt. The payment panel 90 may have a coin slot 92 for accepting one or more money coins and/or one or more tokens. The payment panel 90 may have one or more flat slots 94 for accepting one or more money bills, one or more coupons, one or more checks, one or more credit cards, one or more debit cards and/or one or more ATM cards. The payment panel 90 may have one or more release buttons 96 for returning one or more of the money coins, one or more of the tokens, one or more of the money bills, one or more of the coupons, one or more of the checks, one or more of the credit cards, one or more of the debit cards and/or one or more of the ATM cards. The present invention should not be deemed as limited to a specific embodiment of the payment panel 90, the coin slot 92, the flat slots 94, the release buttons 96, the return bay 98 and/or the payment. It should be understood that the payment may be any payment as known to one having ordinary skill in the art.

In an embodiment, the first end 106 of the base portion 100, the second end 108 of the base portion 100, the front side 110 of the base portion 100 and/or the backside 112 of the base portion 100 may have an input panel 118. The input panel 118 may be used to input a type of article 30 to be manufactured by the apparatus 10. The input panel 118 may have, for example, input keys, touch screen keys and/or the like. The present invention should not be deemed as limited to a specific embodiment of the input panel 118. It should be understood that the input panel 118 may any input mechanism as known to one having ordinary skill in the art.

In an embodiment, the first end 106 of the base portion 100, the second end 108 of the base portion 100, the front side 110 of the base portion 100 and/or the backside 112 of the base portion 100 may have a display panel 116. The display panel 116 may display information such as, for example, a type of article 30 to be manufactured by the apparatus 10, a type of the container 20 that may have been deposited, a weight of the container 20 that may have been deposited, a suitability of the container 20 that may have been deposited, a payment required by the apparatus, a payment deposited into the apparatus, a status of a transformation of the container 20 into the article 30 and/or other like information. The present invention should not be deemed as limited to a specific embodiment of the display panel 116. It should be understood that the display panel 116 may display any information as known to one having ordinary skill in the art.

In an embodiment, the base portion 100 and/or the hood portion 200 may have indicia 114. The indicia 114 may be and/or may display marks, such as, for example, a word, a name, a phrase, a numeral, a numerical sequence, a design, an insignia, a language character, an object, an image, a cartoon, a logo, a trademark and/or the like. The marks may relate to a topic, such as, for example, a cartoon character, an athlete, a musical performer, a political figure, a visual scene, a competition, a written message, a theme and/or the like. Further, the indicia 114 may display a first color and/or a second color. Still further, the indicia 114 may relate to an entity, such as, for example, an entertainment company, a food manufacturing company, a bottling company, an advertising company, a marketing company, a sporting team, an association, a company and/or the like. Moreover, the indicia 114 may be, for example, an advertisement, an announcement and/or a broadcast which may relate to the topic, the entity, a name of a person, a name of a group of people and/or the like. As a result, the apparatus 10 may advertise and/or may market the topic, the entity, the person and/or the group of people to one or more users via the indicia 114. The present invention should not be deemed as limited to the embodiments of specific marks, specific topics and/or specific entities of the indicia 114. It should be understood that the indicia 114 may be and/or may display any information as known to one having ordinary skill in the art.

The hood portion 200 of the apparatus 10 may have a height defined between a top surface 202 of the hood portion 200 and a bottom end 204 of the hood portion 200. The bottom end 204 of the hood portion 200 may be in a position opposite to the top surface 202 of the hood portion 200. The hood portion 200 may have a length defined between a first end 206 of the hood portion 200 and a second end 208 of the hood portion 200. The second end 208 of the hood portion 200 may be in a position opposite to the first end 206 of the hood portion 200. The hood portion 200 may have a width defined between a front side 210 of the hood portion 200 and a backside 212 of the hood portion 200. The backside 212 of the hood portion 200 may be in a position opposite to the front side 210 of the hood portion 200. In an embodiment, the front side 210 of the hood portion 200 may extend parabolically from the bottom end 204 of the hood portion 200 toward the top surface 202 of the hood portion 200. The present invention should not be deemed as limited to a specific embodiment of the hood portion 200.

In an embodiment, the top surface 202 of the hood portion 200, the first end 206 of the hood portion 200, the second end 208 of the hood portion 200, the front side 210 of the hood portion 200 and/or the backside 212 of the hood portion 200 may have one or more receiving bays 40 for receiving the container 20. In an embodiment, the top surface 202 of the hood portion 200, the first end 206 of the hood portion 200, the second end 208 of the hood portion 200, the front side 210 of the hood portion 200 and/or the backside 212 of the hood portion 200 may be made from a transparent material, such as, for example, plastic, glass and/or the like. A transformation of the container 20 into the article 30 may be viewable through the top surface 202 of the hood portion 200, through the first end 206 of the hood portion 200, through the second end 208 of the hood portion 200, through the front side 210 of the hood portion 200 and/or through the backside 212 of the hood portion 200. The present invention should not be deemed as limited to a specific embodiment of the receiving bays 40 and/or the transparent material. It should be understood that the transparent material may be any transparent material as known to a person of ordinary skill in the art.

As shown in FIG. 2, after the container 20 is placed in the receiving bay 40 of the apparatus 10 and after the payment is deposited into the payment panel 90, a system 12 may analyze the shape of the container 20, the barcode 28 on the container 20, and/or the weight of the container 20 to determine whether to accept the container 20 or to reject the container 20. In an embodiment, to analyze the shape of the container 20, the system 12 may have one or more shape sensors 300*a*, 300*b*, as shown in FIG. 2. The shape sensors 300*a*, 300*b* may use light, radio frequencies, magnetic fields and/or the like to analyze the shape of the container 20 as the container 20 rotates on one or more motorized rods 301*a*, 301*b*, as shown in FIG. 2. The motorized rods 301*a*, 301*b* may rotate in a single direction to rotate the container 20. The motorized rods 301*a*, 301*b* may be cylindrical in shape, may be sized to receive the container 20 and/or may be spaced to receive the container 20 without allowing the container 20 to fall through a space between the motorized rods 301*a*, 301*b*. The present invention should not be deemed as limited to a specific embodiment of the sensors 300*a*, 300*b* and/or the motorized rods 301*a*, 301*b*. It should be understood that the sensors 300*a*, 300*b* and/or the motorized rods 301*a*, 301*b* may be any sensors and/or rods as known to one having ordinary skill in the art.

In an embodiment, to analyze the weight of the container 20, the motorized rods 301*a*, 301*b* may connect to one or more spring sensors 302*a*, 302*b*. The spring sensors 302*a*, 302*b* may sense the weight of the container 20. To analyze the barcode 28 on the container 20, the apparatus 10 may have one or more laser readers 303. As the container 20 rotates on the motorized rods 302*a*, 302*b*, the laser reader 303 may read the barcode 28 on the container 20 to determine information about the container 20, such as, for example, the type of the material of the container 20, a recycling code of the container 20 and/or a state of origin of the container 20. The barcode 28 may be, for example, a UPC code and/or the like. The present invention should not be deemed as limited to a specific embodiment of the spring sensors 302*a*, 302*b*, the laser readers 303 and/or the barcode 28. It should be understood that the spring sensors 302*a*, 302*b*, the laser readers 303 and/or the barcode 28 may be any sensors, barcode readers and/or barcodes known to one having ordinary skill in the art.

After analyzing the shape of the container 20, the barcode 28 on the container 20, and/or the weight of the container 20, the system 12 may use a motorized selector 304 to return the container 20 to the user and/or to transport the container 20 to a next stage of manufacture. The motorized selector 304 may rotate about a hinge 305 up to ninety (90) degrees in a first direction and/or up to ninety (90) degrees in a second direction. The first direction may be in a direction opposite to the second direction. If the container 20 is unsuitable, the motorized selector 304 may be rotated in the first direction to return the container 20 to the user. If the container 20 is suitable, the motorized selector 304 may be rotated in the second direction to transport the container 20 to the next stage of manufacture. The present invention should not be deemed as limited to a specific embodiment of the motorized selector 304 and/or the hinge 305. It should be understood that the motorized selector 304 may be any selector known to one having ordinary skill in the art.

In an embodiment, the container 20 may be transported by the motorized selector 304 to one or more rotating members 306*a*, 306*b*, 306*c*, 306*d*. The rotating members 306*a*, 306*b*, 306*c*, 306*d* may secure the container 20 at the bottom portion 22 of the container 20 and/or at the top portion 24 of the container 20. A rotating disc blade 307 may be used to cut the container 20 into a first half 20*a* of the container 20 and into a second half 20*b* of the container 20. The rotating members 306*a*, 306*c* may be simultaneously rotated ninety (90) degrees in a downward direction to transport the first half 20*a* of the container 20 into a position for a cleaning process and/or a drying process. The rotational members 306*b*, 306*d* may be simultaneously rotated ninety (90) degrees in a downward direction to transport the second half 20*b* of the container 20 into a position for the cleaning process and/or the drying process. The present invention should not be deemed as limited to a specific embodiment of the rotating members 306*a*, 306*b*, 306*c*, 306*d* and/or the disc blade 307. It should be understood that the disc blade 307 may be any cutting means known to one having ordinary skill in the art.

In an embodiment, the first half 20*a* of the container 20 and/or the second half 20*b* of the container 20 may be washed by a cleaning member 308 which may spray the first half 20*a* and/or the second half 20*b* of the container 20 with, for example, a cleaning solution 308*a*. The cleaning member 308 may be a tubular pipe with one or more nozzles 308*b* for pressurizing and/or for directing the cleaning solution 308*a* at the first half 20*a* and/or at the second half 20*b* of the container 20. The first half 20*a* and/or the second half 20*b* of the container 20 may be dried with one or more blowers 309. One or more of the blowers 309 may circulate air around the first half 20*a* and/or around the second half 20*b* of the container 20 to increase the speed of the drying process. Further, the air may be heated prior to circulation to expedite the drying process. The present invention should not be deemed as limited to a specific embodiment of the cleaning member 308, the cleaning nozzles 308*b*, the cleaning solution 308*a*, and/or the blowers 309. It should be understood that the cleaning solution 308*a* may be any solution for cleaning the container 20 known to one having ordinary skill in the art.

In an embodiment, the second half 20*b* of the container 20 may be further cut by one or more disc blades 312*a*, 312*b*. The disc blades 312*a*, 312*b* may positioned in a direction perpendicular to the disc blade 307 and/or may be used to cut the remaining top portion 24 of the second half 20*b* of the container 20 and/or the remaining bottom portion 22 of the second half 20*b* of the container 20 from the second half 20*b* of the container 20. As a result, a sheet 20*c* of the second half 20*b* of the container 20 may fall and/or may be transported to a press 400. The press 400 may be molded as a negative form of the article 30. A press extender 401 may be placed on top of the sheet 20*c*. The press extender 401 may be sized to correspond to a perimeter of the press 400. The press extender 401 may have an opening sized for receiving a die 402. The press extender 401 may secure the sheet 20*c* between the press 400 and the press extender 401. The die 402 may be molded as a positive form of the article 30. The die 402 may be passed through the press extender 401 and/or into the sheet 20*c* and/or may form a punched exterior of the article 30. The press extender 401 may be formed to cut one or more flanges 500*a*, 500*b*, 500*c*, 500*d* (as shown in FIG. 3) in the sheet 20*c*. The press extender 401, the punched exterior of the article 30 and/or the press 400 may then be transported below one or more motorized cylindrical cutting rods 310*a*, 310*b*. The present invention should not be deemed as limited to a specific embodiment of the disc blades 312*a*, 312*b*, the sheet 20*c*, the press 400, the press extender 401, the die 402 and/or the flanges 500*a*, 500*b*, 500*c*, 500*d*. It should be understood that the disc blades 312*a*, 312*b* may be any means for cutting the second half 20*b* of the container 20 as known to one having ordinary skill in the art. Further, it should be understood the press 400, the press extender 401 and/or the die may be any dies, press attachments and/or presses as known to one having ordinary skill in the art.

In an embodiment, the first half 20*a* of the container 20, the remaining top portion 24 of the second half 20*b* of the container 20 and/or the remaining bottom portion 22 of the second half 20*b* of the container 20 may be transported and/or released above the motorized cylindrical cutting rods 310*a*, 310*b*. The cylindrical cutting rods 310*a*, 310*b* may have one or more gears 310*c*, 310*d*. The cylindrical cutting rods 310*a*, 310*b* may have one or more cutting discs blades 310*d*, 310*e*. The motorized cylindrical cutting rods 310*a*, 310*b* may be simultaneously rotated. The motorized cylindrical cutting rod 310*a* may be simultaneously rotated in a direction of rotation opposite to a direction of rotation of the motorized cylindrical cutting rod 310*b*. The motorized cylindrical cutting rods 310*a*, 310*b* may be spaced and/or staggered so as to cut and/or to bend the first half 20*a* of the container 20, the remaining top portion 24 of the second half 20*b* of the container 20 and/or the remaining bottom portion 22 of the second half 20*b* of the container 20 into one or more pieces 310*g*. The present invention should not be deemed as limited to a specific embodiment of the motorized cylindrical cutting rods 310*a*, 310*b*, the gears 310*c*, 310*d* and/or the cutting disc blades 310*d*, 310*e*. It should be understood that the motorized cylindrical cutting rods 310*a*, 310*b* may be any means for cutting, bending and/or shredding the container 20 as known to one having ordinary skill in the art.

In an embodiment, one or more of the pieces 310*g* may fall into and/or be transported into the press extender 401 and/or into the press 400. The pieces 310*g* may collect in the press extender 401 on top of the punched exterior of the article 30. Together with the pieces 310*d*, the press extender 401, the punched exterior of the article 30 and/or the press 400 may be transported to a position below a die 403. The die 403 may be formed as a negative of a bottom portion of the article 30. The die 403 may be passed through the press extender 401 and/or into the pieces 310*g* and/or may compress the pieces 310*g* to form an interior of the article 30 adjacent to the punched exterior of the article 30. The present invention should not be deemed as limited to a specific embodiment of the die 403 and/or the interior of the article 30. It should be understood that the die 403 may be any die for forming the article as known to one having ordinary skill in the art.

In an embodiment, the press extender 401 may be removed from a position on top of the punched exterior of the article 30. Further, one or more scraps 20*d* of the punched exterior of the article 30 may be removed from the press 400, as shown in FIG. 3. As shown in FIG. 3, a system 14 may have one or more flanging members 600*a*, 600*b*, 600*c*, 600*d* that may be passed over the press 400 and/or that may lift, may wrap and/or may bend the flanges 500*a*, 500*b*, 500*c*, 500*d* over the interior of the article 30. The die 403 may be pressed into the flanges 500*a*, 500*b*, 500*c*, 500*d* and/or into the interior of the article 30 while in the press 400 and/or may secure the flanges 500*a*, 500*b*, 500*c*, 500*d* to the interior of the article 30. The present invention should not be deemed as limited to a specific embodiment of the scraps 20*d* and/or the flanging members 600*a*, 600*b*, 600*c*, 600*d*. It should be understood that the flanging members 600*a*, 600*b*, 600*c*, 600*d* may be any means for lifting, wrapping and/or bending flanges as known to one having ordinary skill in the art.

In an embodiment, the press 400 and/or the article 30 may be transported to a press table 707, as shown in FIG. 3. One or more wheel sets with axles 705*a*, 705*b* may be retrieved from one or more wheel feeders 706*a*, 706*b* with a wheel tool positioner 704. The wheel tool positioner 704 may transport one or more of the wheel sets with axles 705*a*, 705*b* and place the wheel sets with axles 705*a*, 705*b* on the interior of the article 30. A cover 700 may be retrieved from a cover feeder 701 with a vacuum cap 703. The vacuum cap 703 may transport the cover 700 to cover the wheel sets with axles 705*a*, 705*b* and/or the interior of the article 30. One or more motorized screwdrivers 702*a*, 702*b* may fasten the cover 700 to the interior of the article 30 with one or more screws. The press 400 may be secured to the press table 707. The press table 707 may rotate about a hinge 707*a* and/or the press 400 may release the article 30 into the delivery bay 50. The present invention should not be deemed as limited to a specific embodiment of the press table 707, the hinge 707*a*, the wheel sets with axles 705*a*, 705*b*, wheel feeders 706*a*, 706*b*, the cover 700, the cover feeder 701, the vacuum cap 703, motorized screwdrivers 702*a*, 702*b*, and/or the screws. It should be understood that the screws may be any fasteners as known to one having ordinary skill in the art.

In an embodiment, the user may place the container 20 into the receiving bay 40 of the hood portion 200 of the apparatus 10. The user may deposit the payment into the payment panel 90 of the base portion 100 of the apparatus 10. The user may select the type of the article 30 to be manufactured by the apparatus 10 by using the input panel 118 of the base portion 100 of the apparatus 10. The system 12 of the apparatus 10 may analyze the shape of the container 20, the barcode 28 on the container 20, and/or the weight of the container 20 to determine whether to accept the container 20. The display panel 116 of the base portion 100 may display information including, but not limited to the type of article 30 selected by the user, the type of container 20 placed into the receiving bay 40, the weight of the container 20 placed into the receiving bay 40, the payment deposited by the user into the payment panel 90, the status of the transformation of the container 20 into the article 30, and/or other like information. The system 12, the system 14 and/or the apparatus 10 and/or all connected parts of the system 12, the system 14 and/or the apparatus 10 may be controlled by one or more of the PLCs (not shown).

After accepting the container 20, the motorized selector 304 may rotate about the hinge 305 in the second direction to transport the container 20 to the next stage of manufacture. In the next stage of manufacture, the container 20 may be secured by one or more of the rotating members 306*a*, 306*b*, 306*c*, 306*d*. The rotating disc blade 307 may be used to cut the container 20 into the first half 20*a* of the container 20 and into the second half 20*b* of the container 20. The rotating members 306*a*, 306*b*, 306*c*, 306*d* may be simultaneously rotated ninety (90) degrees in the downward direction to transport the first half 20*a* of the container 20 and/or the second half 20*b* of the container 20 into a position for the cleaning process and/or the drying process. The first half 20*a* and/or the second half 20*b* may be sprayed with a cleaning solution 308 by the cleaning member 308. The warm air may be circulated around the first half 20*a* and the second half 20*b* by one or more of the blowers 309 to increase the speed of the drying process.

The second half 20*b* of the container 20 may be further cut by one or more of the disc blades 312*a*, 312*b* creating the sheet 20*c* of the second half 20*b* of the container 20. The sheet 20*c* may fall and/or may be transported to the press 400. The press extender 401 may be placed on top of the sheet 20*c*, may secure the sheet 20*c* between the press extender 401 and/or the press 400 and/or may cut one or more of the flanges 500*a*, 500*b*, 500*c*, 500*d* in the sheet 20*c*. The die 402 may be passed through the press extender 401 and/or into the sheet 20*c* and/or may form the punched exterior of the article 30. The die 402 may be removed from the press 400 and/or the press extender 401. The press extender 401, the punched exterior of the article 30 and/or the press 400 may then be transported below one or more of the motorized cylindrical cutting rods 310*a*, 310*b*.

The first half 20*a* of the container 20, the remaining top portion 24 of the second half 20*b* of the container 20 and/or the remaining bottom portion 22 of the second half 20*b* of the container 20 may be transported and/or released above the motorized cylindrical cutting rods 310*a*, 310*b*. The motorized cylindrical cutting rods 310*a*, 310*b* may cut, may bend and/or may shred the first half 20*a* of the container 20, the remaining top portion 24 of the second half 20*b* of the container 20 and/or the remaining bottom portion 22 of the second half 20*b* of the container 20 into one or more of the pieces 310*g*. One or more of the pieces 310*g* may fall into and/or may be transported into the press extender 401, the exterior of the article 30 and/or the press 400 which may be below the motorized cylindrical cutting rods 310*a*, 310*b*. The press extender 401, the exterior of the article 30 and/or the press 400 together with one or more of the pieces 310*g* may be transported to and/or situated below the die 403. The die 403 may be passed through the press extender 401 and/or into the pieces 310*g* and/or may compress the pieces 310*g* to form an interior of the article 30 adjacent to the exterior of the article 30 in the press 400 and or in the press extender 401.

The press extender 401 may be removed from the position on top of the exterior of the article 30 and/or on top of the press 400. One or more of the scraps 20*d* may be removed from the press 400 and/or from the exterior of the article. One or more of the flanging members 500*a*, 500*b*, 500*c*, 500*d* may be lifted, may be wrapped and/or may be bent over the interior of the article 30. The die 403 may be pressed into the flanges 500*a*, 500*b*, 500*c*, 500*d* and/or may secure the flanges 500*a*, 500*b*, 500*c*, 500*d* to the interior of the article 30. The press 400 and/or the article 30 may be transported and/or secured to the press table 707. One or more additional components and/or accessories may be secured to the article 30, and/or the press table 707 may rotate about the hinge 707*a* and/or the press 400 may release the article 30 into the delivery bay 50. The apparatus 10 may deliver one or more of the decals 70 through the decal slot 60. The user may remove the article 30 from the delivery bay 50 and/or may remove the decals 70 from the decal slot 60. The user may decorate the article 30 with the decals 70. The apparatus 10 may deliver the receipt to the user through the return bay 98. The user may watch the container 20 being transformed into the article 30 through the transparent material of the top surface 202 of the hood portion 200, of the first end 206 of the hood portion 200, of the second end 208 of the hood portion 200, of the front side 210 of the hood portion 200 and/or of the backside 212 of the hood portion 200.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for transforming a container into an article within a vending machine, the method comprising the steps of:

providing a base, a hood and a programming logic control to control transformation of the container into the article within the base and the hood;

analyzing a weight of the container to determine if the container is empty within the base and the hood using the programming logic control;

cutting the container into a first portion and a second portion within the base and the hood using the programming logic control;

cleaning the first portion of the container and the second portion of the container within the base and the hood using the programming logic control;

drying the first portion of the container and the second portion of the container within the base and the hood using the programming logic control;

pressing the first portion of the container between a press and a first die to form an exterior of the article within the base and the hood using the programming logic control;

cutting the second portion of the container into a plurality of pieces within the base and the hood using the programming logic control; and pressing at least one of the plurality of pieces between the press containing the exterior of the article and a second die to form an interior of the article within the base and the hood using the programming logic control.

2. The method of claim 1 further comprising the step of:

determining a shape of the container within the base and the hood using the programming logic control.

3. The method of claim 1 further comprising the step of:

reading a barcode of the container to determine an origin of the container within the base and the hood using the programming logic control.

4. The method of claim 1 further comprising the step of:

delivering a decal to decorate the article from within the base and the hood using the programming logic control.

5. The method of claim 1 further comprising the step of:

securing a flange of the exterior of the article to the interior of the article within the base and the hood using the programming logic control.

6. The method of claim 1 further comprising the step of:

providing a bay to receive the container within the base and the hood.

7. The method of claim 1 further comprising the step of:

selecting the article to be made from the container using the programming logic control.

8. The method of claim 1 further comprising the step of:

providing a delivery bay to deliver the article from within the base and the hood using the programming logic control.

* * * * *